No. 697,205. Patented Apr. 8, 1902.
Z. T. HALL.
HANDLE FOR WASHBOILERS.
(Application filed Aug. 8, 1901.)
(No Model.)
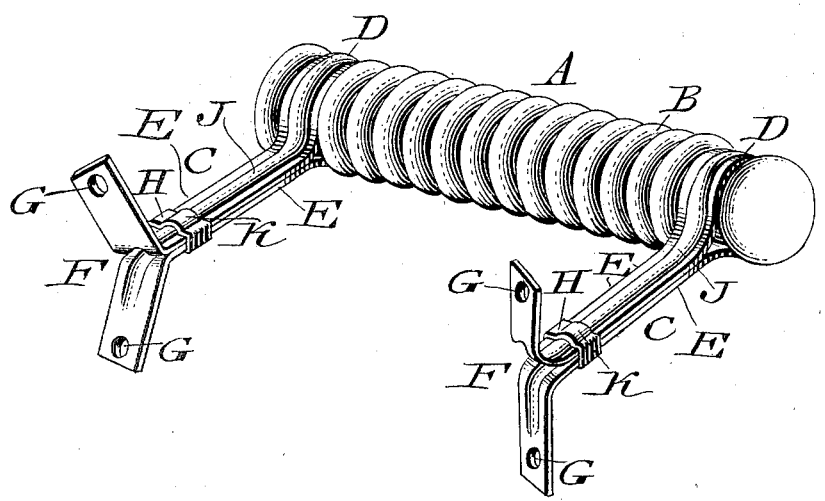
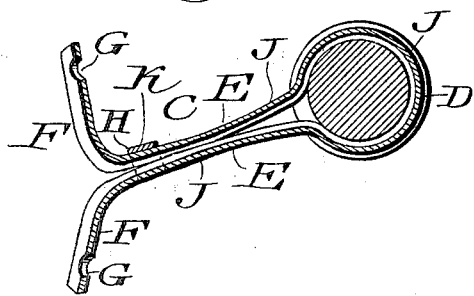
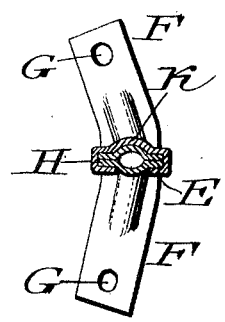

UNITED STATES PATENT OFFICE.

ZACHARY T. HALL, OF PHILADELPHIA, PENNSYLVANIA.

HANDLE FOR WASHBOILERS.

SPECIFICATION forming part of Letters Patent No. 697,205, dated April 8, 1902.

Application filed August 8, 1901. Serial No. 71,312. (No model.)

*To all whom it may concern:*

Be it known that I, ZACHARY T. HALL, a citizen of the United States, residing in the city and county of Philadelphia, State of Pennsylvania, have invented a new and useful Improvement in Handles for Washboilers, &c., of which the following is a specification.

My invention consists of a handle for a washboiler or other receptacle formed of brackets which are adapted to embrace the grip of the handle and provided with means for firmly coupling the two-part members of said brackets.

Figure 1 represents a perspective view of a handle embodying my invention. Fig. 2 represents a section thereof on line $x$ $x$, Fig. 1. Fig. 3 represents a section thereof on line $y$ $y$, Fig. 1.

Similar letters of reference indicate corresponding parts in the figures.

Referring to the drawings, A designates a handle formed of the grip B and the brackets C, the latter consisting each of a piece of metal bent upon itself and shaped to form the collar D, the side arms E in pairs, and the feet F, in which latter are openings G for riveting or securing purposes.

H designates sleeves or clips, each of which embraces the two members of the side arms E and is tightly held thereon, by which means said arms are strongly connected and firmly retained in closed position and prevented from separating.

The brackets are preferably formed of sheet- steel, but to which metal or other material I do not limit myself.

In order to strengthen the collars D and adjacent portions of the side arms, the same have formed thereon the longitudinally-extending ribs or crimps J, which are struck up with the metal, thus bracing and strengthening the handle at the relative places.

The sleeves H have longitudinally-extending ribs or crimps K thereon, the same being struck up with the metal, and thus strengthen the same, it being noticed that the crimps of the sleeves H engage with those of the arms E, thus increasing the strength of the contiguous parts.

Having thus described my invention, what I claim as new, and desire to secure by Letters Patent, is—

1. A handle of the character stated, having a grip, and a supporting-bracket therefor, the latter consisting of arms, a collar adapted to embrace said grip, and a clip embracing said side arms, said arms being provided with means for attachment.

2. In a handle of the character stated, a grip-supporting bracket, consisting of a pair of arms with crimps thereon, and a clip embracing said pair of arms and formed with a crimp, which latter engage the crimps of said arms.

ZACHARY T. HALL.

Witnesses:
JOHN A. WIEDERSHEIM,
WM. CANER WIEDERSHEIM.